No. 643,019. Patented Feb. 6, 1900.
H. G. WALTON.
ATTACHMENT FOR SEED PLANTERS.
(Application filed Feb. 18, 1899.)
(No Model.) 2 Sheets—Sheet 1.
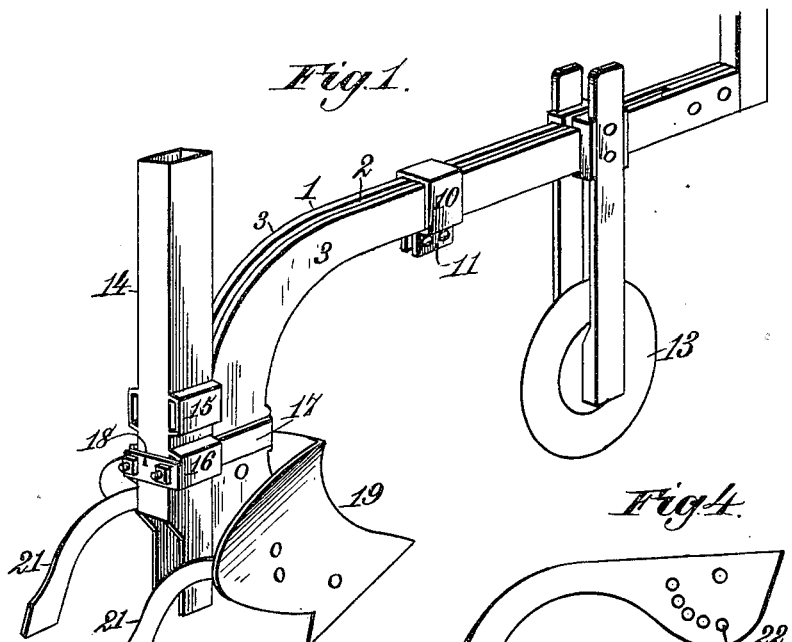
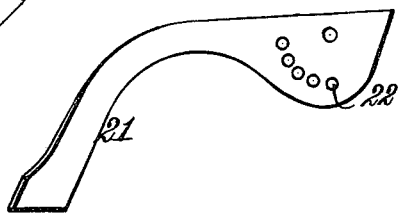
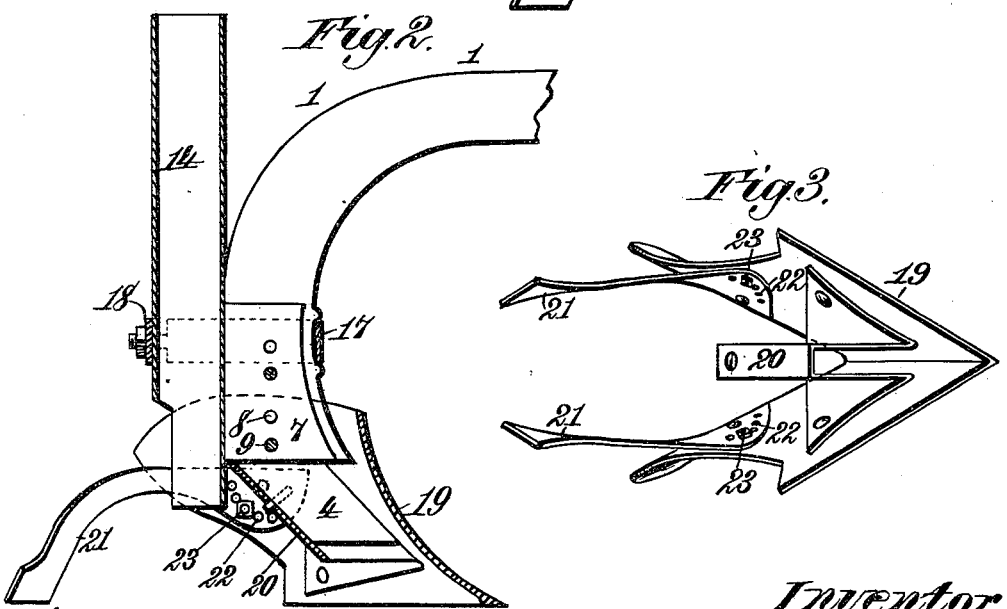
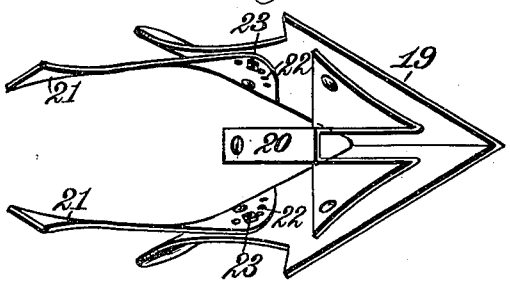
Witnesses.
Robert Everett.
Inventor.
Herbert G. Walton,
By James L. Norris
Atty.

No. 643,019. Patented Feb. 6, 1900.
H. G. WALTON.
ATTACHMENT FOR SEED PLANTERS.
(Application filed Feb. 18, 1899.)
(No Model.) 2 Sheets—Sheet 2.
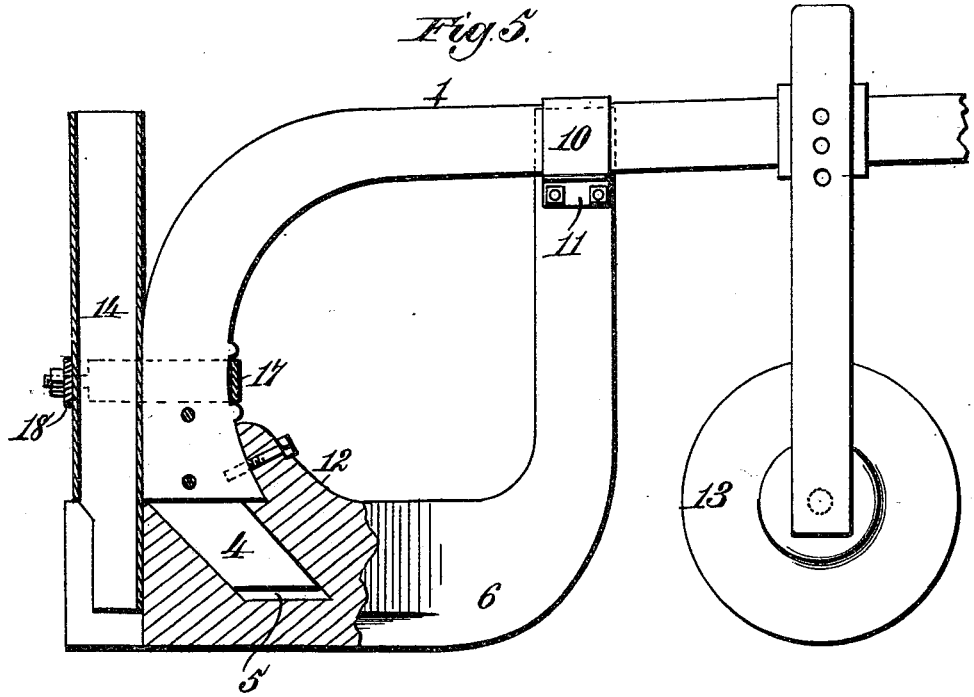
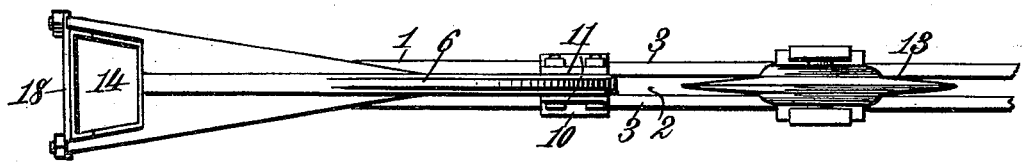
Witnesses,
Robert Errett,
H. B. Keeley
Inventor,
Herbert G. Walton,
By James L. Norris
Atty.

UNITED STATES PATENT OFFICE.

HERBERT G. WALTON, OF BUTLER, MISSOURI.

ATTACHMENT FOR SEED-PLANTERS.

SPECIFICATION forming part of Letters Patent No. 643,019, dated February 6, 1900.

Application filed February 18, 1899. Serial No. 706,001. (No model.)

*To all whom it may concern:*

Be it known that I, HERBERT G. WALTON, a citizen of the United States, residing at Butler, in the county of Bates and State of Missouri, have invented new and useful Improvements in Attachments for Seed-Planters, of which the following is a specification.

It frequently happens in the spring, when the ground has been prepared for planting, that before the planting can be completed rains will come, causing the operation to be suspended, and thereby delaying the time at which the operation may be completed. Even when operations are resumed it is frequently found that the unplanted portion will have become so tightly packed that it is necessary to again work the same before the ground is in condition to receive the seed. This not only makes additional labor for the farmer, but delays the completion of the planting for days and perhaps weeks. The ordinary runner or shoe now commonly employed upon planters makes the cut or furrow so narrow that the wheels of the planter will force weeds or grass back on top of the seed, and then if rains come the weeds or grass, having a start of the seed, practically choke the latter.

My invention is designed to overcome the difficulties above mentioned by providing an attachment for the ordinary planter, to be used as a substitute for the runner or shoe thereof, by means of which a wide furrow may be cut, which will do away with the necessity of reworking the land after rains and will prevent the wheels from forcing the weeds or grass back on top of the seed.

Other objects and advantages of my invention will hereinafter appear, and the novel features thereof will be set forth in the claims.

In the accompanying drawings, Figure 1 is a perspective view with my attachment applied. Fig. 2 is a longitudinal section of the same. Fig. 3 is a bottom plan view of the plow attachment. Fig. 4 is a detail view of one of the coverers. Fig. 5 is a side elevation, partly in section, of a planter provided with an ordinary shoe. Fig. 6 is a bottom plan view of the same.

The drag-bar 1, which is provided at its forward end with means for attaching it to the planter-frame, is longitudinally and vertically slotted, as shown at 2, or made in two pieces, forming parallel arms 3 3. The rear end of said bar 1 extends downward and is provided with a tenon 4, adapted to be received in a socket 5 in the ordinary shoe or runner 6. The said tenon is adjustably and removably secured to the drag-bar 1, the same being formed with a shank 7, provided with a series of perforations 8. The said shank fits between the two parallel members of the drag-bar 1 and is held in place thereon by means of the pins 9, which extend through two of the perforations 8 and through corresponding openings in the drag-bar 1. The forward end of said shoe extends upwardly and fits within the slot 2 in the drag-bar 1 and is removably secured thereto by means of a clamp 10, which embraces the horizontal portion of the bar 1 and is provided with ears 11, through which and the upper end of the runner 6 securing-bolts or other analogous devices may be passed. The said runner is further secured to the lower rear end of the drag-bar 1 by means of a bracket 12 and bolts extending therethrough. To the forward end of the drag-bar 1 may be adjustably secured a rotary cutter or colter 13. This is a great advantage when used upon sod, but may be dispensed with, if desired. The seed tube or conduit 14 leads from the ordinary seed-hopper and discharges at its lower end adjacent to the rear of the runner 6. The same is formed upon opposite sides with guide and supporting loops 15 and 16, through which the clip 17 passes, which clip also embraces the rear end of the drag-bar 1. The reduced ends of said clip extend through a securing-plate 18 and are locked thereto by means of nuts or other equivalent devices. By the provision of two sets of guide and supporting loops 15 and 16 the seed tube or conduit 14 may be adjusted up or down.

It will be observed that the shoe or runner 6, herein shown and described and which is similar in construction to those now in use, will cut such a narrow furrow that the supporting-wheels of the planter will force back the loose weeds or grass on top of the seed. This objection I overcome by removing the shoe 6 in a manner readily understood from the foregoing description and substituting therefor a hollow double moldboard-plow 19, having a socket 20 for receiving the tenon 4 and otherwise secured to the drag-bar 1 in a manner similar to that described with reference to the shoe 6. The said plow is provided with adjustable coverers 21, which are pivoted to the sides thereof and are provided with a series of openings 22 22, arranged at equal distances from the pivotal points of said runners and adapted to receive a securing-bolt 23, which extends through one of said openings and through a corresponding opening in the plow 19. The shoe or runner 6 may be readily removed whenever desired and the plow 19 substituted therefor. When the plow is in operative position, the seed-tube 14 is raised and held in place by the clip 17, which extends through the lower pair of guide-loops 16. In operation the plow will cut a deep and wide furrow, which will extend beyond the sides of the planter-wheels, and the space between the furrows may be worked over after the ground has been planted. Furthermore, the plow will serve to thoroughly loosen up the ground after rains and in this respect is a marked advantage over the ordinary planter now in common use.

By the use of the adjustable and removable tenon 4 on the drag-bar 1 the same can be readily replaced by a new one in case of breakage, and the height of the plow 19 relative to the other parts of the machine may be regulated.

By having two or three sizes of plows or plow-shovels and employing the larger of the series many stalk-fields that are clean and mellow in early spring may be planted without ever breaking them, using the planter as a lister. The corn can be planted between the old stalk-rows, and as many farmers advocate shallow cultivation a planter with a plow instead of a shoe would serve their purposes and dispense with a great deal of unnecessary labor. It will be understood, however, that by my invention I can use the planter either in its ordinary form or with a plow adapted to cut a wide furrow instead of the ordinary planter-shoe.

Having thus described my invention, what I claim is—

1. The combination of the drag-bar with a seed-planter, means for attaching an ordinary plow thereto, substantially as described.

2. A seed-planter having a drag-bar provided with means for the attachment thereto of an interchangeable runner and plow, substantially as described.

3. A seed-planter having a drag-bar constructed at its rear pendent end with a tenon to receive a socket in an interchangeable runner and plow, and means for detachably securing the runner and plow to the tenon of the drag-bar, substantially as described.

4. A seed-planter having a drag-bar carrying at its rear end a removable and replaceable plow and constructed also to engage and hold a runner, substantially as described.

5. In a seed-planter, the combination with the drag-bar thereof, of a seed tube or conduit, and means for adjusting the position of said tube or said bar.

6. In a seed-planter, the combination with the drag-bar thereof, of a seed tube or conduit provided with a plurality of guide and supporting loops, and a clip embracing said drag-bar and adapted to be inserted through one or the other of said loops, as and for the purposes set forth.

7. The combination with the drag-bar of a planter of a plow adapted to be attached thereto, and means for adjusting the height of said plow thereon.

8. The combination with the drag-bar of a planter, of a plow having a socket therein, and an adjustable and removable tenon on said bar adapted to be received in said socket.

In testimony whereof I have hereunto set my hand in presence of two subscribing witnesses.

HERBERT G. WALTON.

Witnesses:
JOHN S. FRANCISCO,
H. C. CLARK.